Aug. 11, 1964   H. T. HODGES ETAL   3,143,948
AUTOMATIC COPYING DEVICE
Filed April 17, 1961   9 Sheets—Sheet 1

Howard T. Hodges
Charles E. Swing
Clarence R. Taylor
INVENTORS

BY
ATTORNEYS

Aug. 11, 1964  H. T. HODGES ETAL  3,143,948
AUTOMATIC COPYING DEVICE
Filed April 17, 1961  9 Sheets-Sheet 7

Howard T. Hodges
Charles E. Swing
Clarence R. Taylor
INVENTORS

BY R. Frank Smith
Steve W. Gremban
ATTORNEYS

Aug. 11, 1964  H. T. HODGES ETAL  3,143,948
AUTOMATIC COPYING DEVICE
Filed April 17, 1961  9 Sheets-Sheet 8
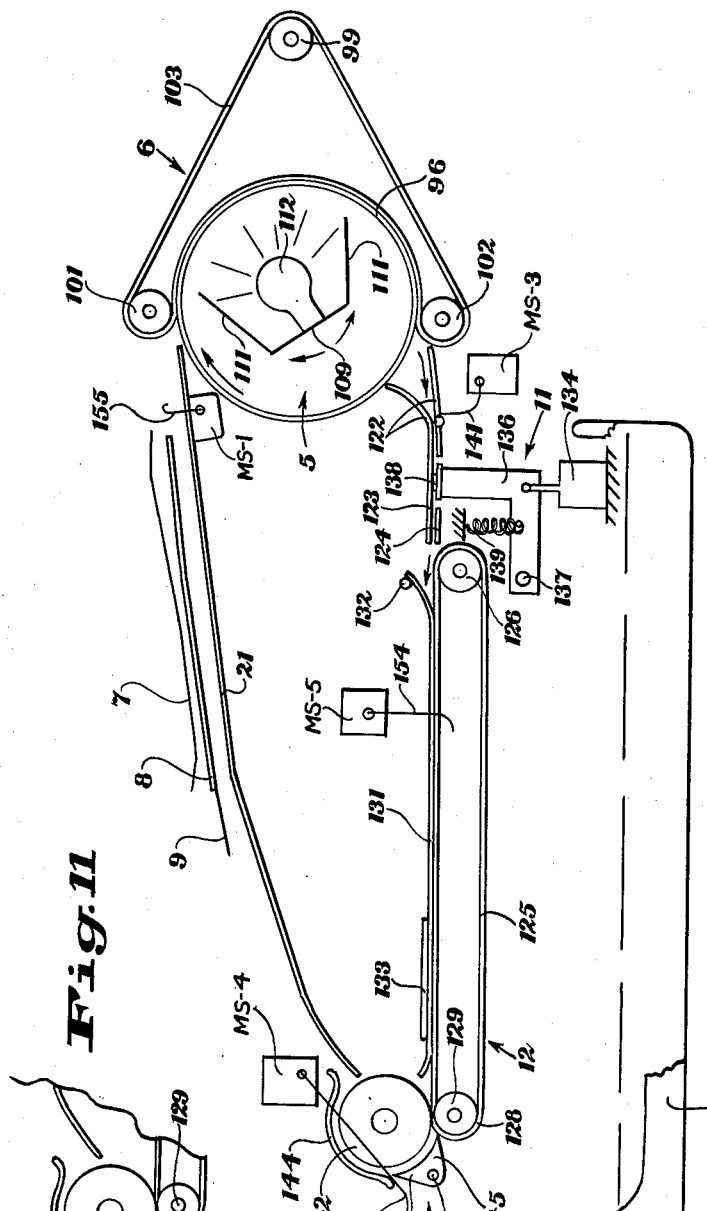
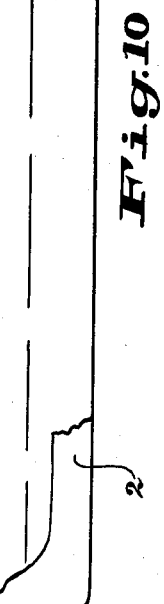
Howard T. Hodges
Charles E. Swing
Clarence R. Taylor
INVENTORS
BY R. Frank Smith
Steve W. Grenshaw
ATTORNEYS Howard T. Hodges
Charles E. Swing
Clarence R. Taylor
INVENTORS

3,143,948
AUTOMATIC COPYING DEVICE
Howard T. Hodges, Charles E. Swing, and Clarence R. Taylor, Rochester, N.Y., assignors to Eastman Kodak Company, Rochester, N.Y., a corporation of New Jersey
Filed Apr. 17, 1961, Ser. No. 103,612
13 Claims. (Cl. 95—77.5)

This invention relates generally to photographic reproduction, and more specifically to an automatic photographic exposing, processing and image-transfer copying device.

Photographic copying devices of the type in which a sensitized photographic sheet is exposed, processed in a suitable processing liquid, and placed in intimate contact with a non-sensitized copy sheet to cause transfer of an image from the photographic sheet to the copy sheet are well known in the art. A device of this type is specifically disclosed in U.S. Patent No. 2,666,384. The principle upon which this type of apparatus operates is disclosed in U.S. Patent No. 2,596,756, in which a film or paper support, coated with a substantially unhardened silver halide gelatin emulsion containing a pigment or dye in a tanning developing agent, is exposed to a suitable two-toned subject, such as a line or halftone subject, after which the sensitized film or paper is processed by immersion in an alkaline solution. This processing results in the developing of the exposed image, and the simultaneous hardening or tanning of the gelatin in the exposed and developed areas. Thereafter, the excess fluid may be squeegeed from the processed sheet which is then pressed, while still moist, into contact with a nonsensitized sheet of paper having an absorbent surface. After separation of the sheets, it will be found that a stratum of the unexposed, and therefore, unhardened areas of the emulsion layer will have been transferred to the sheet of paper. This process thus produces a direct positive image. Moreover, although the image is immediately discernible upon separation of the two sheets because of the pigment or dye in the transferred emulsion, this image will darken further upon exposure to light since the transferred emulsion also contains sensitized silver halide.

This process is particularly useful since it permits making several reproductions from the exposure of a single sensitized sheet. This is possible because in the transfer of unhardened gelatin to the absorbent sheet, only a stratum thereof is carried over. The processed sheet may again be wetted in the alkaline solution, squeegeed and pressed against a second absorbent sheet whereby a second stratum of the unhardened gelatin will be transferred. It is possible to repeat this a number of times before the unhardened gelatin is exhausted to the extent that acceptable copies are no longer obtainable.

Since the composition of the emulsion, as well as a number of modifications thereof, and the chemistry of this process are fully disclosed in the above-noted patents and actually form no part of the present invention, we have omitted such data in the specification. We refer to this process, however, in that the apparatus disclosed below, which comprises the present invention, is particularly adapted for use in this process and in such variations thereof as may occur to those skilled in this art.

Copying devices of the type described provide only the basic essentials for transferring an image from a matrix master to a nonsensitized copy sheet. The device normally has an exposure station comprising a transparent support upon which the matrix and copy sheet are positioned in superposed relation and exposed for a predetermined time. The copying device further has a tray containing activator solution into which the exposed matrix is inserted and developed, a separate container for holding and positioning the copy paper, and a simple, manually operable mechanism for squeegeeing the excess solution from the matrix and immediately thereafter pressing the matrix into intimate contact with the image-receiving copy sheet. It is necessary in this type of device for the operator to insert the exposed matrix into the activator tray, time the development, manually pull out the matrix after development along with a piece of copy paper which is pressed into intimate contact therewith, manually strip the two apart, and reinsert the matrix into the activator and repeat the cycle for as many copies as is required, or for as long as the matrix lasts. It is also necessary for the operator to trim a tab which is about an inch and a half long off each copy sheet to produce the final copy. The tab is present by virtue of the fact that a portion of the matrix and the copy sheet are kept out of the activator solution to facilitate handling of the matrix and copy paper by the operator.

In the improved copying device embodying the present invention, the operator initially introduces a matrix and copy sheet in superposed relation into the device which automatically exposes the matrix, returns the original to the operator, and transports the exposed matrix into the activator solution in the processing tray. The device further automatically times the development of the matrix and upon actuation by the operator advances a copy sheet to a specified position with respect to the matrix. A warning device is actuated upon completion of the development of the matrix, following which the operator manually withdraws the matrix out of the tray along with the advanced sheet of copy paper, and then manually strips the two apart. To make additional copies, a switch is depressed by the operator causing the machine to automatically draw the manually introduced matrix into the activator solution. Upon actuation of another switch, another copy sheet is automatically advanced to the specified position. The matrix and copy sheet are then manually pulled out of the device during which they are squeegeed and pressed together, and the two are then stripped apart. This cycle may be repeated for as many copies as the operator requires or for as long as the matrix lasts. The copying device further has a "repeat" position enabling the operator to expose a second original and matrix in superposed relation while making copies from the first exposed matrix.

Therefore, one of the primary objects of this invention is to provide a new and improved automatic photographic copying device.

Another object of this invention is to provide an improved copying device for automatically exposing an original and matrix in superposed relation, returning the original to the operator, and transporting the exposed matrix into the processing solution of a tray for development.

Another object of this invention is to provide an improved photographic copying device having means enabling the operator to expose a second original and matrix in superposed relation while making copies from the first exposed matrix.

One more object of this invention is to provide an improved copying device in which the copy sheets used therein have the same dimensions as the original to which the matrix is exposed, thereby making it unnecessary to trim off a tab from the finished copy sheet.

Still another object of this invention is to provide an improved copying device of simple design and construction, thoroughly reliable and efficient in operation, and economical to manufacture.

An additional object of this invention is to provide an improved copying device composed of a plurality of removable components, facilitating assembly and repair.

Another object of the invention is to provide an improved photographic copying device having a matrix holder movable to a predetermined position to permit the operator to expose a plurality of originals in superposed relation with a single matrix.

An additional object of this invention is to provide an improved copying device having novel means for separating the original from the matrix.

Still another object of this invention is to provide an improved copying device having means for separating the original from the matrix and directing the original in one direction and the matrix in a different direction.

A further object of the invention is to provide an improved copying device having adjustable stop means in the processing tray for limiting the distance the matrix is introduced therein depending upon the size of the matrix.

Still another object of this invention is to provide a transport roller movable by the processing tray from an inoperative position to an operative position for transporting copy sheets.

One more object of this invention is to provide an improved photographic processing device for simultaneously transporting a manually introduced matrix into the processing tray and a copy sheet into its operative position.

The above and other objects and advantages will be apparent from the following description when read in connection with the accompanying drawings, in which:

FIG. 10 is a diagrammatic view of the copying device showing the means for exposing the original and matrix in superposed relation, and the means for separating the original from the matrix and returning the original back to the operator;

FIG. 11 is a segmental view of the deflecting means of FIG. 10 showing the deflecting means in a position for directing the matrix into the processing tray.

Figure 1:
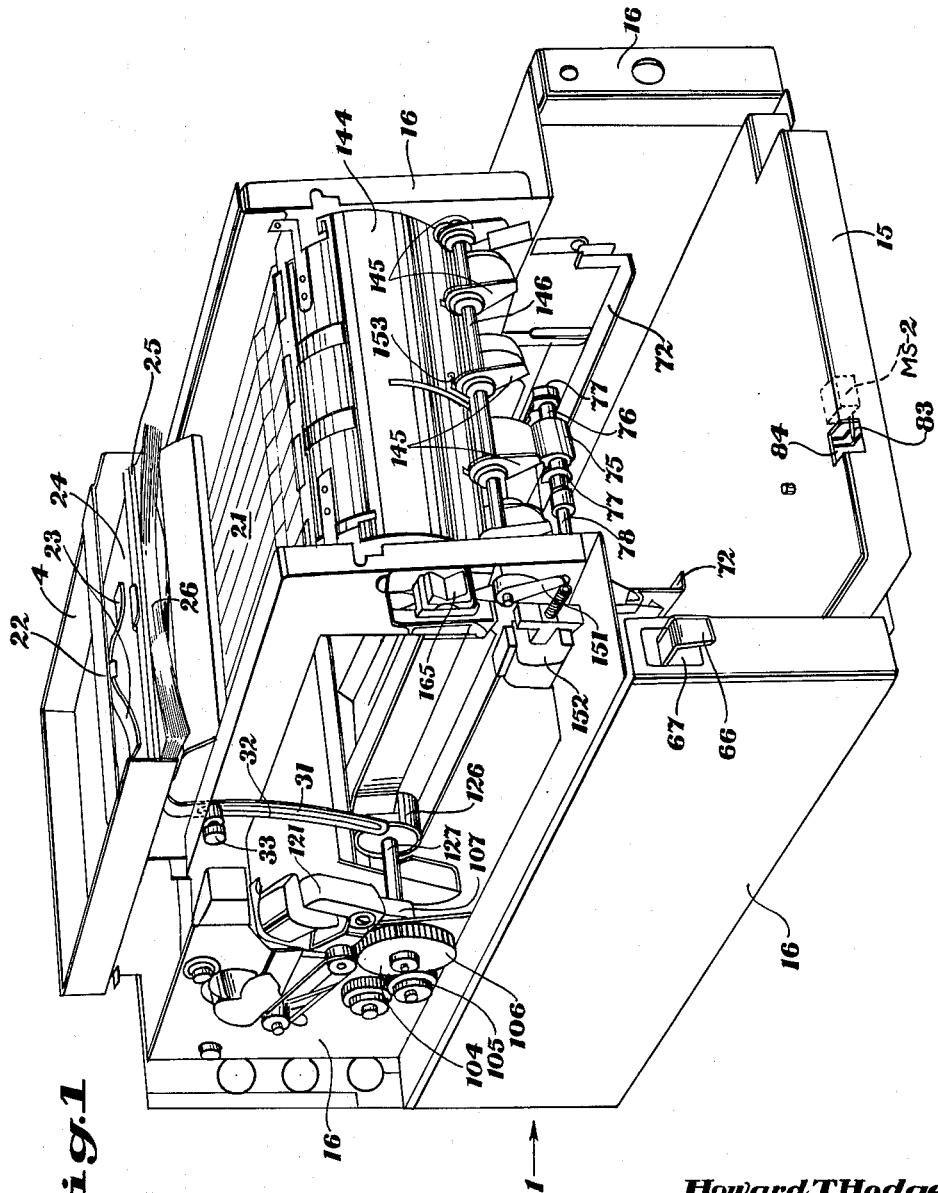
FIG. 1 is a perspective view showing a preferred embodiment of the copying device of this invention with the processing tray, copy sheet holder and cover plates removed therefrom for purposes of clarity.
Figure 2:
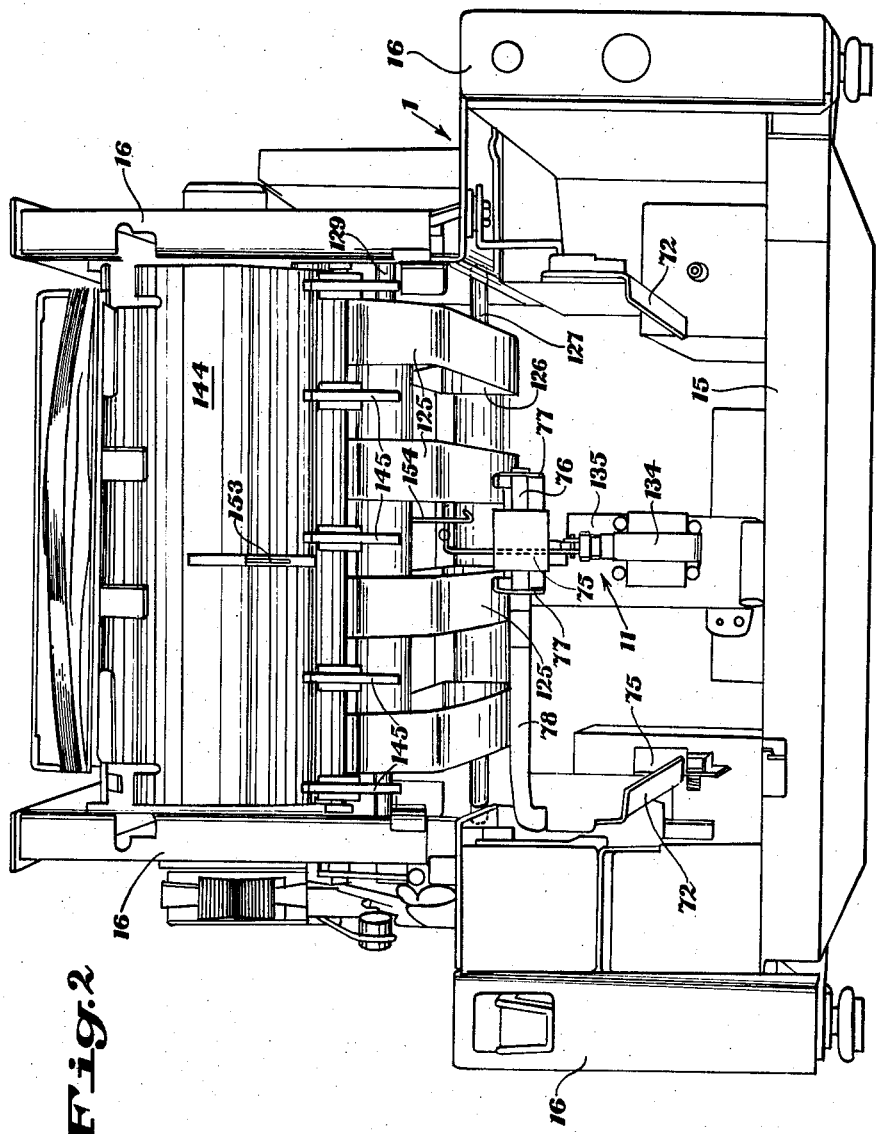
FIG. 2 is a front view in perspective of the copying device of FIG. 1.
Figure 4:
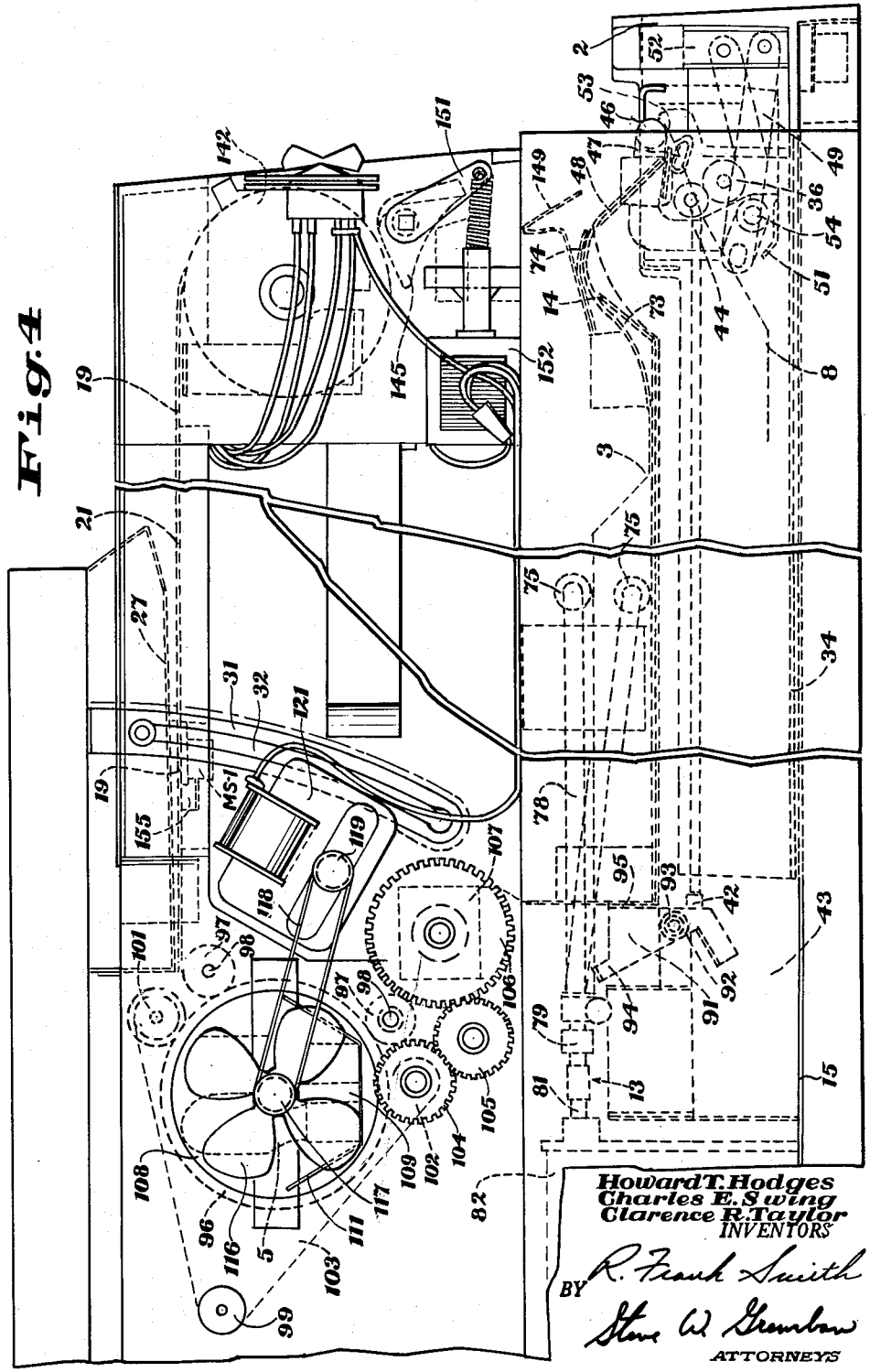
FIG. 4 is a segmental side elevation view of the copying device with the side cover plate removed therefrom.
Figure 5:
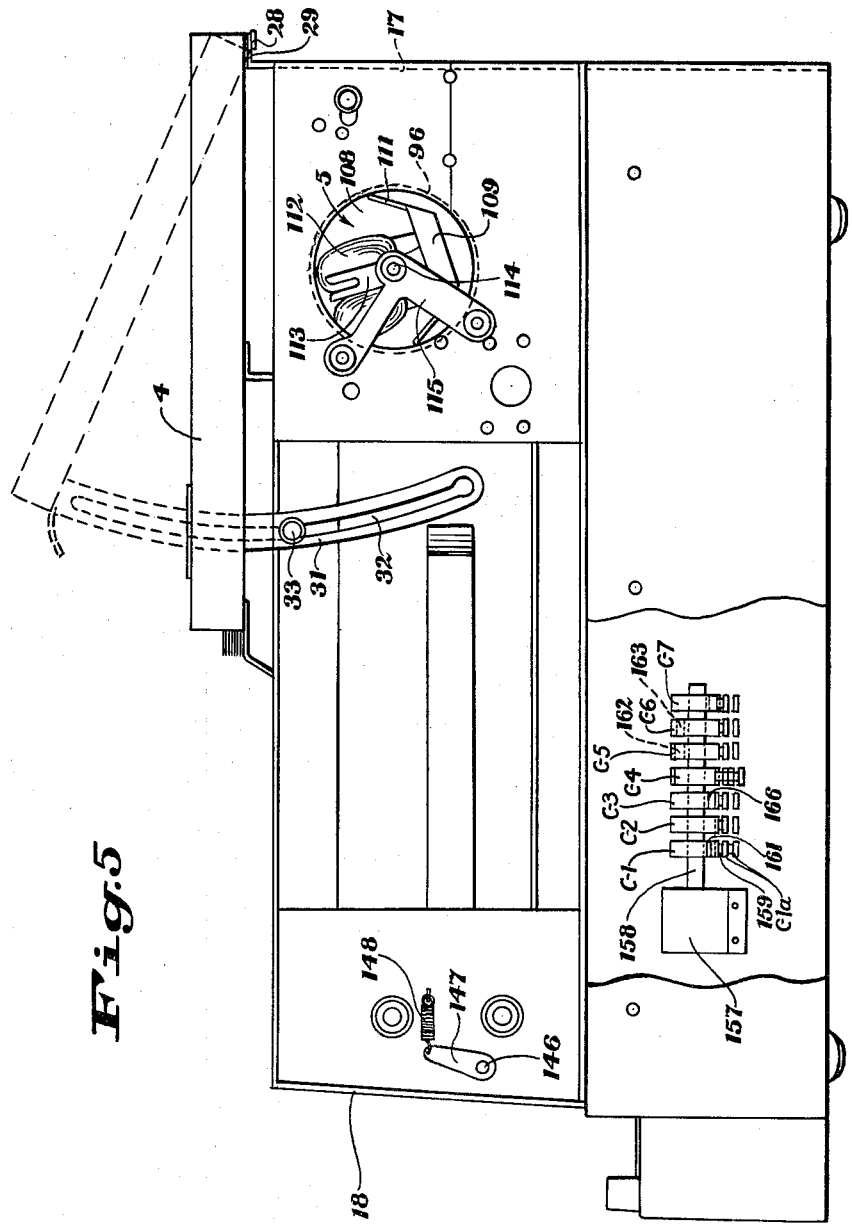
FIG. 5 is a side elevation view of the opposite side of the copying device with the side cover plate removed therefrom.
Figure 6:
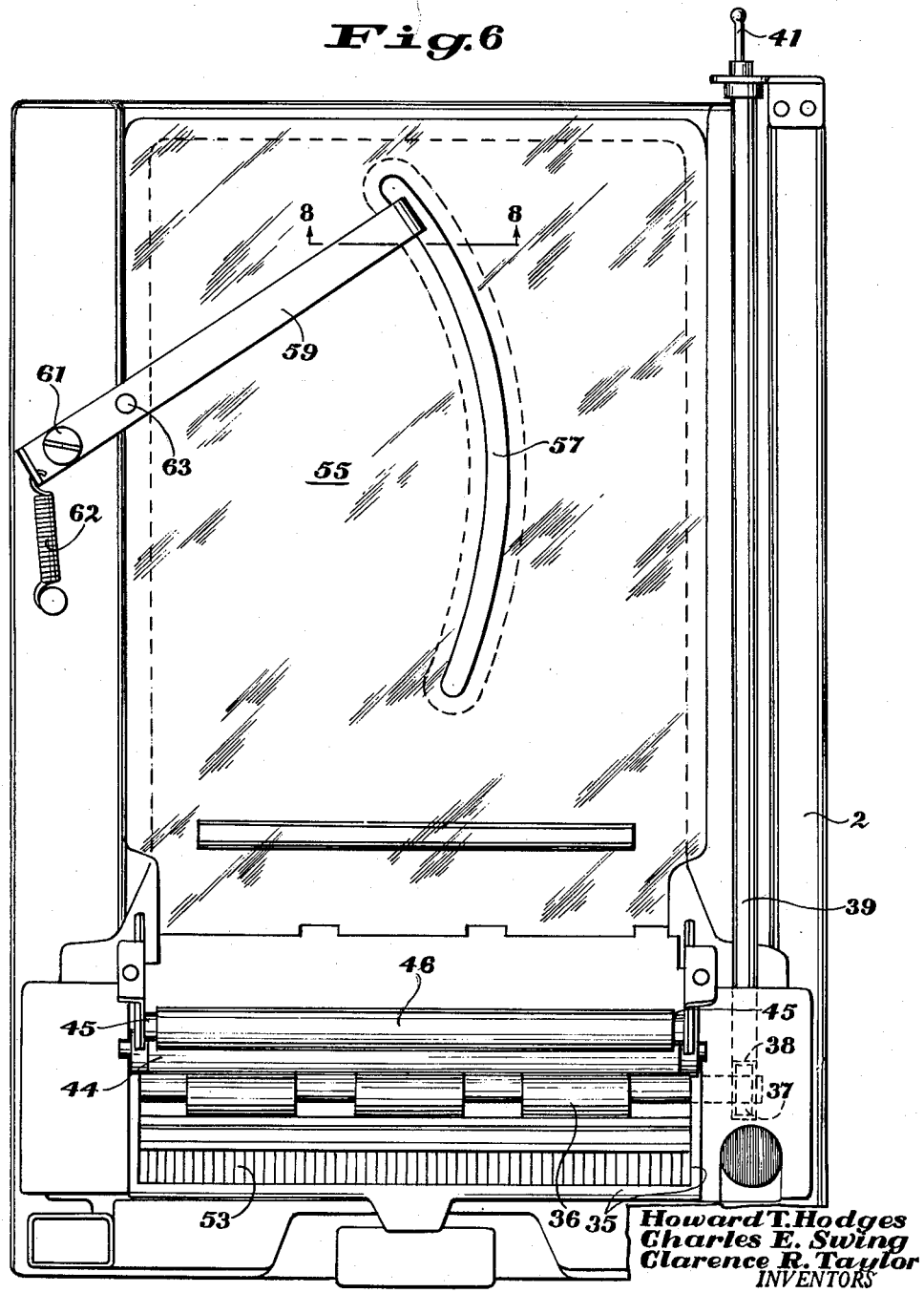
FIG. 6 is a top plan view of the processing tray incorporated in this copying device.
Figure 7:
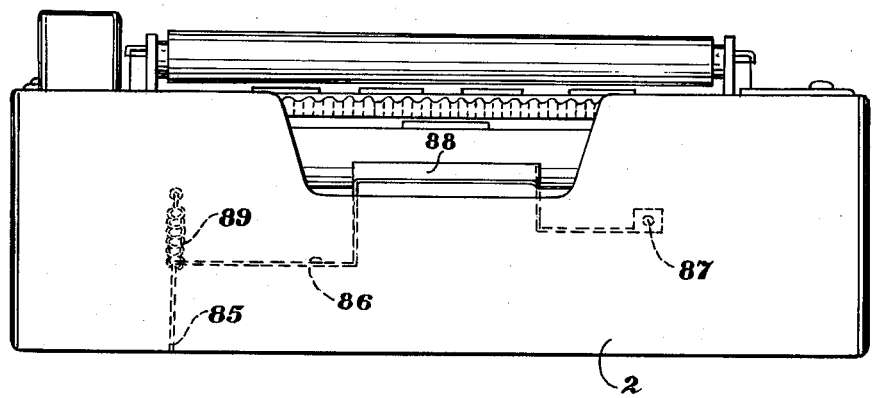
FIG. 7 is a front elevation view of the processing tray of FIG. 6.
Figure 8:
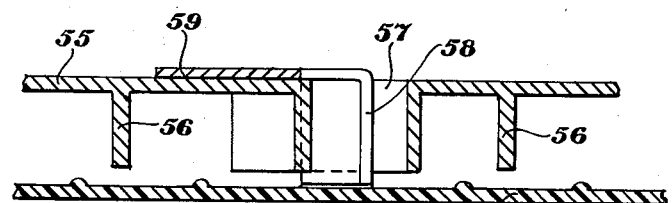
FIG. 8 is a segmented view in elevation taken along line 8—8 of FIG. 6.
Figure 12:
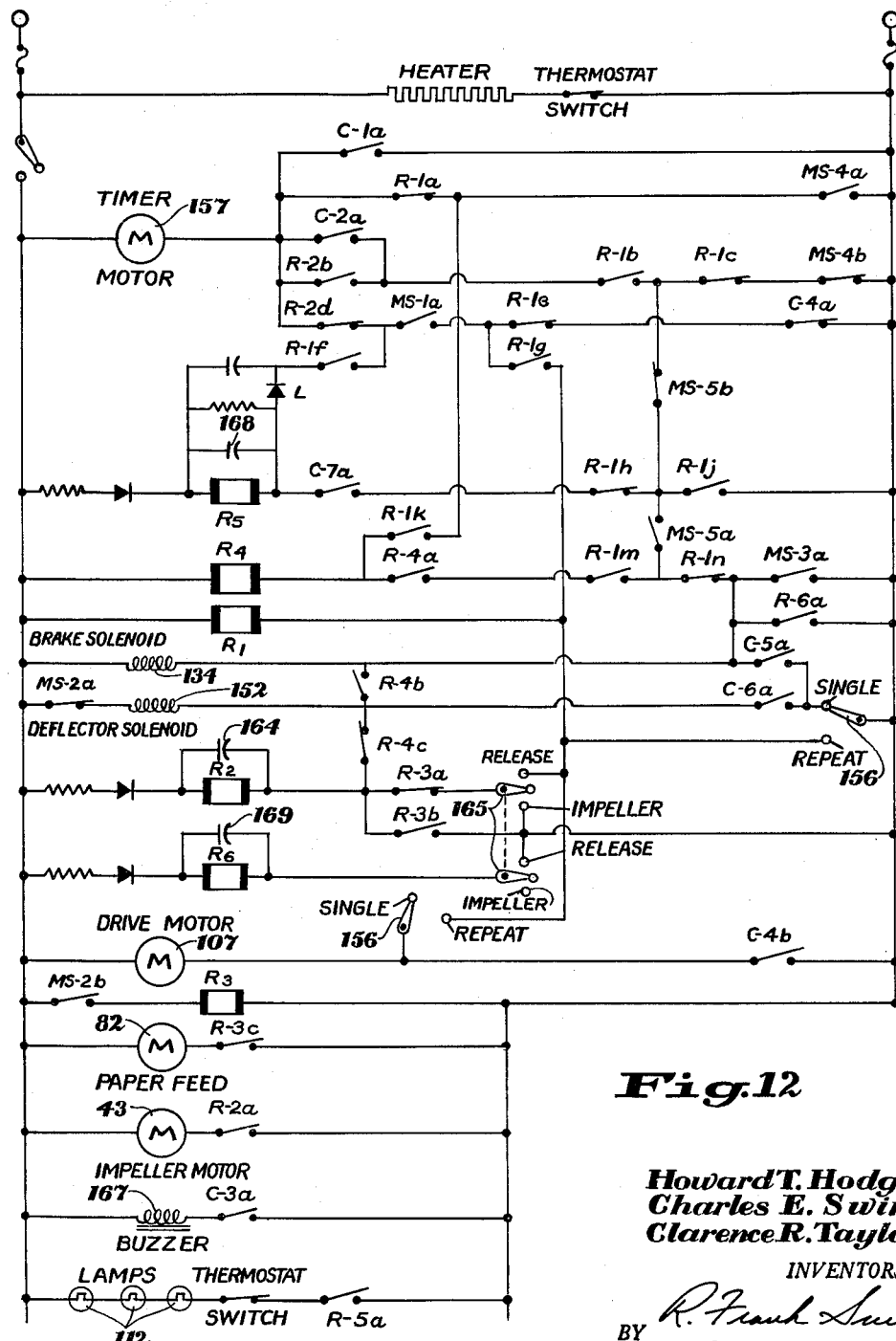
FIG. 12 is a schematic wiring diagram for the photographic copying device of this invention.

A preferred embodiment of this invention is disclosed in the drawings and generally comprises a housing 1 as best seen in FIGS. 1 and 2 for supporting a removable tray 2, seen best in FIGS. 4, 6 and 7, provided with a processing solution, a removable copy sheet holder 3 mounted above the tray as seen best in FIG. 4, a movable matrix holder 4 as seen in FIG. 1 mounted on the top of housing 1, an exposing mechanism 5 seen best in FIGS. 4, 5 and 10 for exposing a single large original or a plurality of small originals and matrix placed in superposed sandwich relation, a transport mechanism 6 as seen in FIG. 10 for transporting the original and matrix through the copying device, and the necessary drive and control means for the copying device, seen best in the wiring diagram of FIG. 12. With respect to the general operation of this copying device, the operator initially places a single original or a plurality of originals, copies of which are desired, on a matrix 8 to form an original-matrix sandwich having a tab 9 of matrix 8 extending past one edge of an original 7 as seen in FIG. 10, and manually feeds the sandwich into the exposing mechanism 5. The sandwich actuates a drive mechanism to be explained in detail hereinafter for driving transport mechanism 6 for transporting the sandwich through exposing mechanism 5 where matrix 8 is exposed. The original or originals are then separated from matrix 8 by a separating mechanism 11 and transported by another transport mechanism 12 back to the operator. The matrix 8 is then transported and directed into the processing solution in tray 2 for development. After matrix 8 has been developed for the required period of time, a signal means is actuated denoting this fact to the operator. To make copies of the original or originals, the operator actuates a drive mechanism 13 for advancing a copy sheet 14 as seen in FIG. 4 into engagement with matrix 8. The operator manually withdraws matrix 8 from processing tray 2 along with the sheet of copy paper 14 which is pressed into engagement therewith, and then manually strips the two apart in the normal way whereby an image is transferred from matrix 8 to copy sheet 14. Having described the general operation of the copying device, the device will now be described in detail.

The housing 1, as best seen in FIGS. 1 and 2, comprises a base 15, side frames 16 secured to the sides of base 15, rear and front cover plates 17 and 18 respectively as seen in FIG. 5 secured to side frames 16, and a pair of spaced-apart plates 19 seen dotted in FIG. 4 spanning side frames 16 adjacent their upper ends for supporting a removable plate 21 forming a support platform for matrix 8 and original 7. The matrix holder 4 as seen in FIG. 1 comprises a rectangular box-like member having a brace 22 spanning its sides for supporting spring fingers 23 which engage and urge a cover plate 24 having a rubber lip 25 at one end thereof into engagement with a supply of matrixes 26 for holding the matrixes 26 in a substantially lighttight position. The matrix holder 4 has a lower guide plate 27 as seen in FIG. 4 which in its operative position co-operates with plate 21 to form a passageway therebetween into which matrix 8 and original 7 are inserted in superposed relation. The rear end of holder 4 has a pair of flat, spaced-apart projections 28, only one of which is shown in FIG. 5, insertable in slots formed in a flange 29 of rear plate 17 to form a pivot for holder 4. An arcuate arm 31 is secured to each of two sides of holder 4 adjacent the front end thereof, and has arcuate slots 32 therein co-operating with pins 33 carried by side frames 16 as seen in FIGS. 1 and 5. By virtue of the pin-and-slot connection, matrix holder 4 is movable between a closed position and an open position, seen dotted in FIG. 5, for a purpose to be explained hereinafter.

Figure 3:
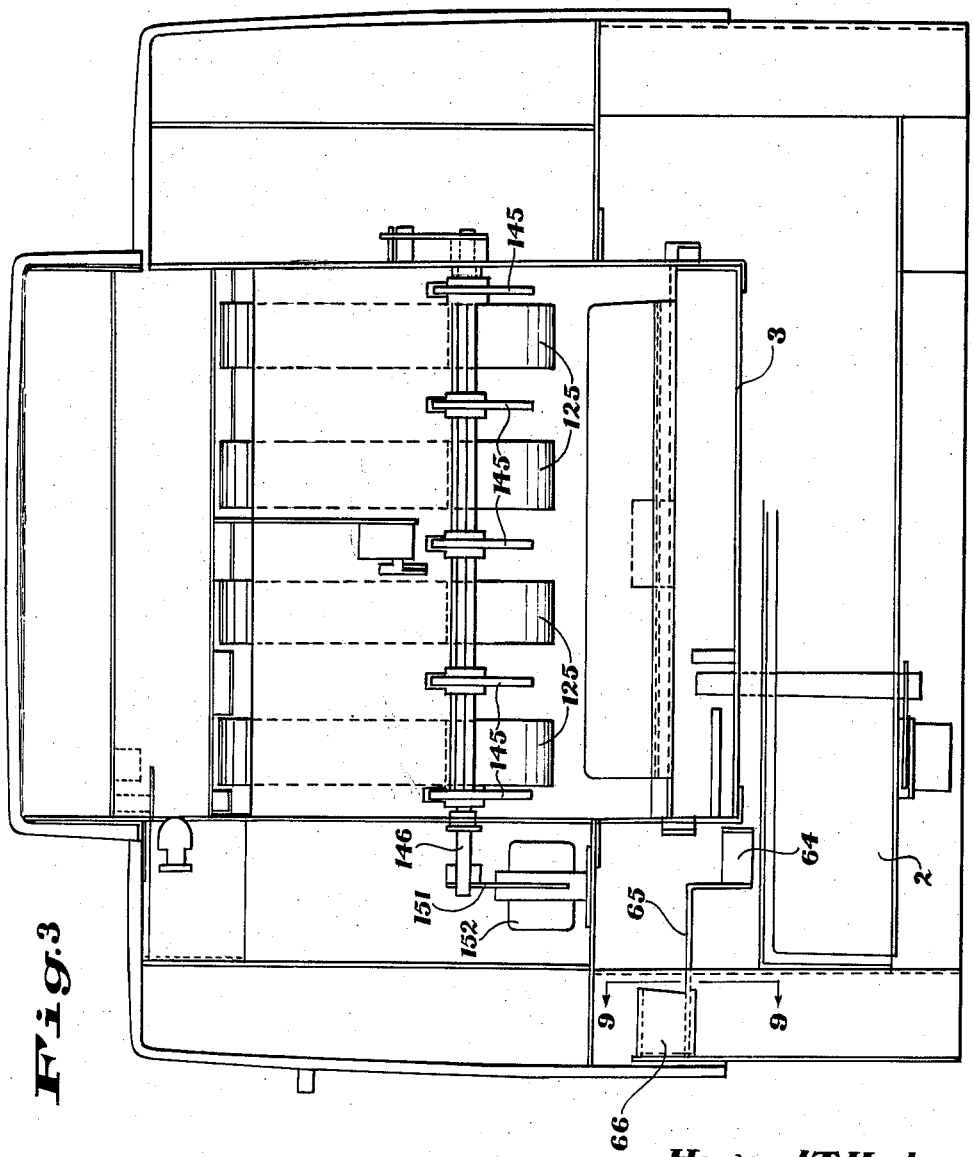
FIG. 3 is a front elevation view of the copying device of this invention with the front cover plate removed therefrom.
Figure 9:
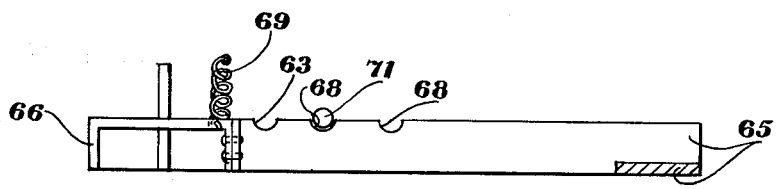
FIG. 9 is a segmented elevation view partly in section taken along line 9—9 of FIG. 3.

The processing tray 2, as seen best in FIGS. 4, 6, 7 and 8, comprises a rectangular box-like member having a base 34 and four sides molded as a unit out of some suitable plastic. A frame member 35 is secured to the front end of tray 2, and supports an impeller roller 36 having a gear 37 at one end driven by a pinion 38 secured to one end of a drive shaft 39, the opposite end of drive shaft 39 which is adapted to be insertable into a fixedly mounted complementary coupling member 42 driven by an impeller motor 43 mounted on base 15 as seen dotted in FIG. 4. Since any known type of coupling device may be used, no attempt will be made to describe this particular coupling device in detail in this application, particularly since a coupling device of this type is disclosed in detail in a pending U.S. application, Serial No. 56,502, now Patent No. 3,038,322, filed on September 16, 1960, by William C. Wilson. The frame member 35 is provided with slots at each end for receiving the ends of a pressure roller 44 which bears against impeller roller 36 and applies a pressure thereto dependent upon its weight. The frame member 35 further supports spaced-apart brackets 45 pivotally secured thereto at 54 as seen in FIG. 4 for supporting a pressure roller 46, a squeegee 47 and a guide plate 48, and brackets 45 are movable by a pivotal lever 49 having one end secured to an arm 51 provided by one bracket 45 and the opposite end secured to a reciprocally movable plunger 52 supported by tray 2 as seen dotted in FIG. 4. A spring, not shown, interposed between arm 51 and frame member 35 biases brackets 45 and pressure roller 46 to a normally inoperative position, and manual movement of plunger 52 urges pressure roller 46 against the bias of the spring into its operative position in pressure-engaging relation with a support ramp 53 provided by frame 35. The tray 2 further has a plastic cover plate 55 secured thereto as seen best in FIGS. 6 and 8, and plate 55 has depending ribs 56 extending toward the base 34 of tray 2 for guiding a matrix 8 toward the bottom of tray 2 to assure that it is totally immersed in the processing solution. The tray 2 further has an arcuate slot 57 therein for receiving one end 58 of a lever 59 pivoted at 61 and urged by spring 62 in a counter clockwise direction. The end 58 of lever 59 extends substantially to the bottom of tray 2 and forms a stop for a matrix 8 inserted into tray 2. The lever 59 has a pin 63 engageable by a finger 64 provided by a reciprocally movable plate 65 seen best in FIGS. 3 and 9 having a handle portion 66 extending through an opening 67 in one of the side frames 16 as best seen in FIGS. 1 and 3. The plate 65 has three recesses 68 which are selectively urged by a spring 69 into engagement with a stud 71 carried by side frame 16 to form a detent for positioning plate 65 in one of three positions, "legal," "letter" or "memo," depending upon the size of matrix 8 to be used. When plate 65 is moved by handle 66 into the "legal" position, spring 62 urges pin 63 into engagement with finger 64 with end 58 of lever 59 in a position to provide a stop for a legal size matrix. When plate 65 is moved by handle 66 to the "letter" position, finger 64 urges pin 63 and lever 59 against the bias of spring 62 for holding end 58 of lever 59 in a position to provide a stop for a letter size materix. In the "memo" position, end 58 of lever 59 is moved closer towards the front of tray 2 to provide a stop for a memo size matrix.

A pair of spaced-apart supporting ways 72 is secured to side frames 16 as seen best in FIG. 2 for supporting rectangular box-like copy sheet holder 3. The front end of copy sheet holder 3 as seen best in FIG. 4 has an inclined ramp 73 extending upwardly from its bottom to assure the advancement of a single copy sheet. The front end of copy sheet holder 3 further has a deflector plate 74 overhanging ramp 73 for directing a copy sheet 14 downwardly over the tray deflector plate 48 and into the nip formed by pressure roller 46 and ramp 53 when pressure roller 46 is moved by the operator into its operative position seen dotted in FIG. 4. The copy sheet 14 is normally not advanced unless a matrix 8 is present in processing tray 2, and consequently the leading edge of copy sheet 14 will enter the nip formed between pressure roller 46 and matrix 8 which is interposed between pressure roller 46 and ramp 53. Consequently, when the operator withdraws matrix 8 from tray 2, copy sheet 14 is drawn along therewith and pressed into intimate contact with matrix 8 by pressure roller 46. This mechanism for squeegeeing the excess solution from matrix 8 and pressing copy sheet 14 and matrix 8 into intimate contact is described in detail in a pending U.S. patent application, Serial No. 26,577, now Patent No. 3,099,208, filed May 3, 1960, by Howard T. Hodges et al. The drive mechanism 13 for advancing the copy sheets 14 comprises a transport roller 75 secured to a shaft 76 journaled in a bracket 77 secured to housing 1 as seen in FIGS. 1 and 2. The shaft 76 is secured to one end of a flexible drive shaft 81 supported by a curved tubular member 78 whose opposite end is pivotally secured to a housing bracket 79 as seen best in FIG. 4. The opposite end of shaft 81 is connected to some suitable paper feed motor 82. As seen in the schematic wiring diagram of FIG. 12, the impeller and paper feed motors 43, 82 are in circuit with a switch MS–2 mounted underneath the front of base 15 and having an actuating element 83 extending into a notch 84 struck out therefrom as seen in FIG. 1. The actuating element 83 is engageable by one end 85 of a lever 86 pivotally secured to the front end of processing tray 2 at 87 as seen in FIG. 7. A portion of lever 86 extends through a slot in tray 2 and has a handle 88 secured thereto by which the operator may depress lever 86 against the bias of a spring 89 causing end 85 to move actuating element 83 and close switch MS–2 completing the circuit to the motors 43, 82. Upon completion of the circuit, the motors 43, 82 operate to drive driving roller 36 for reintroducing a matrix 8 into processing tray 2 and driving transport roller 75 for advancing a copy sheet 14. The housing 1 further pivotally supports a lever 91 on stud 92 as seen dotted in FIG. 4 which is biased by a spring 93 in a clockwise direction causing one end 94 thereof to engage tubular member 78 and pivotally urge member 78 in a direction withdrawing transport roller 75 from copy sheet holder 3. The lever 91 further has a flange 95 seen best in FIG. 2 extending into the path of one of the ways 72, and is engageable by one end of copy sheet holder 3 as it is moved into its operative position, and urged against the bias of spring 93 releasing tubular member 78 which drops down by gravity urging roller 75 into engagement with the copy sheets 14 in holder 3 as seen in FIG. 4.

The exposing mechanism 5 of this copying device as best seen in FIGS. 4 and 5 comprises a glass cylinder 96 rotatably supported at each end by nylon guide rollers 97 carried by stub shafts 98 secured to side frames 16. Three rollers 99, 101, 102 are mounted adjacent cylinder 96, two of which 101, 102 are substantially in engagement with cylinder 96 for supporting an endless transport belt 103, a portion of which is wrapped around slightly over 180° of the periphery of cylinder 96. The belt 103 and cylinder 96 co-operate to form a transport means for the original-matrix sandwich which is fed into the nip between belt 103 on roller 101 and cylinder 96. The roller 102 has a pinion 104 mounted thereon connected by gears 105 and 106 to the drive shaft of a drive motor 107. Upon operation of drive motor 107, gears 106, 105 and 104 drive roller 102 for turning belt 103 which in turn drives cylinder 96 therealong. The side frames 16 are provided with openings 108 in register with the ends of cylinder 96 as seen in FIG. 5, and a lamp support 109 and reflector 111 for lamps 112 are formed as a single unit disposed in cylinder 96, and has flanges 113 at each end pivotally mounted on studs 114 supported by braces 115 secured to side frames 16. By varying the position of reflector 111, it is possible to vary the intensity of the illumination to which the matrix 8 is exposed. One of the studs 114 has a fan 116 and pulley 117 mounted thereon as seen in FIG. 4 driven by a belt 118 connected to a drive pulley 119 mounted on the shaft of a drive motor 121 for blowing air through cylinder 96 for cooling lamps 112.

After the original-matrix sandwich is transported by belt 103 and cylinder 96 through the exposing mechanism 5, it is guided between an anvil 123 and a support bracket 124 by any suitable deflecting flanges 122 shown schematically in FIG. 10 and onto the outer surfaces of a plurality of endless transport belts 125. The belts 125 are mounted on pulleys 126 secured to a shaft 127 connected to the drive shaft of motor 107, which further drives gear 106 as indicated earlier. The belts 125 are further supported by pulleys 128 mounted on a shaft 129 rotatably journaled in side frames 16 of the copying device. A pressure means for urging the matrix-original sandwich into engagement with the outer surface of transport belts 125 comprises a plurality of leaf springs 131 as best shown in FIG. 10, one for each belt, each spring 131 having one end secured to a fixed shaft 132 and the opposite end bearing against belt 125. The opposite end of each spring 131 has a rectangular bar 133 of metal secured thereto forming a weight for positively urging the original matrix sandwich into engagement with transport belt 125.

The copying device further has a separator mechanism 11 as seen best in FIGS. 2 and 10 to facilitate separating the original 7 from the matrix 8. This mechanism 11 comprises an electrically operated solenoid 134 mounted on a bracket 135 secured to base 15. The solenoid 134 is connected to a bell crank 136 intermediate its ends, the bell crank 136 being pivoted about a stud 137 at one end, and its opposite end having a rubber tip 138 mounted thereon forming a brake shoe. A spring 139 normally urges bell crank 136 in a direction causing rubber tip 138 to engage anvil 123. When solenoid 134 is actuated, bell crank 136 is pivoted against the bias of its spring 139 withdrawing rubber tip 138 from anvil 123. A microswitch MS-3 connected in circuit with solenoid 134 as seen in FIG. 12 is secured to housing 1 and has an actuating element 141 extending into the path of the original-matrix sandwich and interposed between the outlet of exposing mechanism 5 and brake shoe 138. The leading edge of the original-matrix sandwich engages and moves actuating element 141 closing contacts MS-3a and energizing solenoid 134 which withdraws brake shoe 138 from anvil 123 allowing cylinder 96 and belt 103 to transport the sandwich therebetween and onto transport belts 125. As soon as the trailing edge of tab 9 of matrix 8 passes actuating element 141, it resumes its original position opening microswitch contacts MS-3a. This de-energizes solenoid 134 causing brake shoe 138 to strike tab 9 of matrix 8 and urge it against anvil 123 for releasably holding matrix 8 and preventing it from being moved by transport belts 125. The original 7, on the other hand, is in engagement with transport belts 125 and is transported thereby to soft rubber rollers 142, seen best in FIG. 10, which are in peripheral engagement with transport belts 125 and driven thereby. The original 7 is deflected upwardly by a deflecting means 143, and rollers 142 transport original 7 through the space between a deflector plate 144 secured to side frames 16 as seen in FIGS. 1 and 2 and rollers 142 onto supporting platform 21. The deflecting means 143 comprises a plurality of spaced apart arms 145 mounted on a shaft 146 rotatably supported by side frames 16. One end of shaft 146 has a lever 147 secured thereto and a spring 148 interconnected between lever 147 and side frame 16 as seen in FIG. 5 for urging shaft 146 and arms 145 into a first deflecting position for deflecting original 7 upwardly around rollers 142 and onto supporting platform 21 as seen in FIG. 10. The deflector arms 145 are axially spaced along shaft 146 and interposed between rollers 128 and belts 125 and in their first deflecting position are moved below the level of belts 125 for directing the transported sheet upwardly, and in a second deflecting position as seen in FIG. 11 are disposed above the level of belts 125 whereupon the leading edge of the transported sheet strikes arms 145 and is directed downwardly and guided by flange 149 of sheet holder 3 into the nip between driver roller 36 and pressure roller 44 of processing tray 2 which are in their normally inoperative position. The opposite end of shaft 146 has an arm 151 secured thereto which is connected to a solenoid 152 mounted on side frame 16, and which is adapted when energized to move deflector arms 145 into their second deflecting position. A microswitch MS-4 mounted on housing 1 has an actuating element 153, seen best in FIGS. 1, 2 and 10, extending through an opening in plate 144 and into the path of the transported original 7 between the outlet of transport belts 125 and support platform 21, and is engaged by the leading edge of original 7 actuated for a purpose to be explained hereinafter. When the trailing end of original 7 passes actuating element 153, it drops by gravity back to its normal position.

Another microswitch MS-5 is secured to the underside of housing 1 and has an actuating element 154 extending downwardly between two of the transport belts 125 into the path of the original-matrix sandwich as seen best in FIGS. 2 and 10. Also, a microswitch MS-1, as seen dotted in FIG. 4 is secured to the underside of plate 19 and has an actuating element 155 extending through a slot in supporting platform 21. The function served by these microswitches MS-1 and MS-5 will be explained hereinafter.

With respect to the specific operation of this copying device with particular reference to the wiring diagram thereof shown in FIG. 1, let us assume initially that the power supply for the device is turned on and that the device is in a "rest" position with a toggle switch 156 in the "single" position. To make a copy of an original 7, the operator places a matrix 8 on supporting platform 21 with its emulsion surface up and with the tab 9 toward the front of the machine. The operator then places original 7 on matrix 8 with the printed side of the original in contact with the emulsion. In this position, the tab 9 of matrix 8 extends past one end of original 7 as seen in FIG. 10. The operator then manually moves the original-matrix sandwich along supporting platform 21 towards the exposing mechanism 5. The leading edge of the original-matrix sandwich strikes actuating element 155 of microswitch MS-1 momentarily closing normally open contacts MS-1a for connecting the power supply through normally closed contacts R-1d, R-1c and C-4a to a timer motor 157 which is actuated for rotatably driving cams C-1, C-2, C-3, C-4, C-5 and C-6, all of which are mounted on the same shaft 158 as seen in FIG. 5. Initial rotation of cam C-1 closes contacts C-1a to keep timer motor 157 energized. Also, initial rotation of cam C-4 opens contacts C-4a and closes normally open contacts C-4b completing a circuit to drive motor 107 for driving same. Rotation of cam C-7 closes switch contacts C-7a completing a circuit through closed contacts R-1h, MS-5b, R-1c and MS-4b to a clamp control relay R-5 which when energized closes contacts R-5a connecting the power supply to exposure lamps 112 which are illuminated. As soon as cam shaft 158 turns through an angle of approximately 45°, a cam follower 159 bottoms in a peripheral recess 161 in cam C-1, opening contacts C-1a for disconnecting the power supply to timer motor 157. As soon as the leading edge of the original-matrix sandwich enters the nip of belt 103 and cylinder 96, it is advanced thereby through the exposure zone. As the leading edge of the original-matrix sandwich leaves cylinder 96, it strikes actuating element 141 of microswitch MS-3 closing normally open contacts MS-3a for connecting the power supply to brake release solenoid 134 which is energized withdrawing brake shoe 138 from anvil 123. The original-matrix sandwich is transported by belt 103 and cylinder 96 between brake shoe 138 and anvil 123 and onto conveyor belts 125, and the leading edge thereof engages actuating element 154 of microswitch MS-5 closing normally open contacts MS-5a for transferring control of lamp control relay R–5 from microswitch MS–4 and contact MS–4b to microswitch MS–3 and contact MS–3a. As soon as the trailing end of matrix tab 9 passes the actuating element 141 of MS–3, it is released and returns to its normal position opening contacts MS–3a to deenergize relay R–5, which after the delay period is produced by capacitors will disconnect the power to the exposure lamps 112 for extinguishing same. This also de-energizes brake release solenoid 134 causing brake shoe 138 to strike matrix tab 9 for releasably holding matrix 8 immovably on the moving conveyor belts 125. The original 7 which is in engagement with conveyor belts 125 continues to move and is transported thereby to deflector arms 145 which, in their normal position, deflect original 7 between deflector plate 144 and roller 142 onto supporting platform 21. As original 7 is transported to supporting platform 21, the leading end thereof engages actuating element 153 of microswitch MS–4 closing normally open contacts MS–4a for restarting timer motor 157 through closed contacts R–1a and R–4d. As timer motor 157 operates rotatably driving cam shaft 158 through an angle of approximately 115 degrees, a projection 162 on cam C–5 closes contacts C–5a connecting the power supply to brake release solenoid 134 which is energized withdrawing brake shoe 138 from anvil 123 for releasing matrix 8. At substantially the same time, a peripheral projection 163 on cam C–6 closes contacts C–6a connecting the power supply to deflector solenoid 152 which is energized moving deflector arms 145 into a position for directing matrix 8 into the nip between respective impeller and pressure rollers 36, 44. The contacts C–6a also energizes the impeller motor control relay R–2 by way of normally closed contacts R–4c of relay R–4, relay R–2 closing normally open contacts R–2a for connecting the power supply to impeller motor 36 which operates to transport matrix 8 into processing tray 2. A large capacitor 164 having a capacitance of approximately 160 microfarads is connected in parallel with relay R–2 to provide a delay circuit for keeping relay R–2 energized by discharging therethrough for approximately 15 seconds after contacts C–6a are opened by continued operation of timer motor 157. This delay circuit is necessary in those instances where impeller motor 36 is operated by movement of a toggle switch 165 to the "impeller" position. The delay circuit makes it unnecessary for the operator to keep toggle switch 165 actuated for the full length of time required for impeller motor 36 to transport the matrix 8 into tray 2. The matrix 8 as it is transported by conveyor belts 125 into the nip between the impeller and pressure rollers 36, 44 releases actuating element 154 of microswitch MS–5 opening contacts MS–5a and closing contacts MS–5b but this is without effect at this time. After a predetermined development time for matrix 8 in the solution, a peripheral projection 166 on cam C–3 closes contacts C–3a connecting the power supply to a buzzer solenoid 167 for actuating a suitable warning device such as a buzzer, not shown, to indicate to the operator that matrix 8 has been developed and that copies may be made therefrom. To accomplish this, the operator depresses lever handle 88, seen in FIG. 7, moving actuating element 83 of microswitch MS–2 opening normally closed contacts MS–2a and closing normally open contacts MS–2b for energizing a paper feed control relay R–3 which closes contacts R–3c connecting the power supply to paper feed motor 82 to start the latter, and also closes contacts R–3b to again energize impeller motor control relay R–2 to start impeller motors 43. The transport roller 75 advances a copy sheet 14 to the nip formed between matrix 8 and pressure roller 46, and the operator then grasps tab 9 of matrix 8 and withdraws matrix 8 from processing tray 2 along with copy sheet 14 which is urged into intimate contact therewith by pressure roller 46. The operator then strips copy sheet 14 from matrix 8 and reintroduces matrix 8 into tray in the event that another copy is desired. This operation may be repeated to provide additional copies of the original. To reintroduce matrix 8 into tray 2, the operator moves toggle switch 165 into the "impeller" position for connecting the power supply impeller motor control relay R–2. Relay R–2 is energized closing normally open contacts R–2a for connecting the power supply to impeller motor 43 which is operated to transport matrix 8 into processing tray 2. When toggle switch 165 is returned to its normal position, relay R–2 continues to hold contacts R–2a closed for an additional 15 seconds by virtue of the delay circuit causing impeller motor 43 to operate for an additional 15 seconds.

Let us assume that the operator desires to expose another matrix-original sandwich while the first exposed matrix 8 is being developed. This cannot be done when the device is set in the "single" position since the contacts C–7a associated with cam C–7 will be open at this time, preventing re-energization of lamp control relay R–5. To expose another sandwich while the previous matrix 8 is being developed, the operator places toggle switch 156 in the "repeat" position. In this position, drive motor 107 is connected directly across the power supply and runs continuously, and repeat relay R–1 is energized opening contacts R–1a, R–1c, R–1d, R–1e, R–1h and R–1n and closing contacts R–1b, R–1f, R–1g, R–1j, R–1k and R–1m. When under these conditions the new original-matrix sandwich is fed into the device causing its leading edge to actuate microswitch MS–1, a circuit for energizing lamp control relay R–5 is completed through a rectifier L and the now closed points of repeat relay F–1 for completing the electrical circuit to exposure lamps 112 which are illuminated. When R–5 is thus energized by MS–1, a capacitor 168 is also charged so that thereupon when microswitch MS–1 returns to its normal position opening contacts MS–1a upon passage of the sandwich, relay R–5 continues to be energized for an additional 3 or 4-second period while this capacitor discharges therethrough. This additional delay circuit ensures that lamp 112 will remain illuminated at least until the sandwich has moved past the exposure position. The sandwich, as it is transported by belt 103 and cylinder 96, actuates microswitch MS–3 closing normally open contacts MS–3a for energizing brake release solenoid 134 which again withdraws brake shoe 138 from anvil 123 to permit this second sandwich to pass therebetween. However, MS–3 again is opened to reapply brake shoe 138 in time for the latter to grab the new matrix tab while letting the second original continue to move. As before, the original is transported by conveyor belts 125 to deflector arms 145 which in their normal position deflect the original back to support platform 21. The leading end of the original actuates microswitch MS–9 opening contacts MS–4b and closing contacts MS–4a for connecting the power supply through closed contacts MS–4a and R–1b to relay R–4 which is energized, closing normally open contacts R–4a and R–4b. Although microswitch MS–4 returns to its original position opening contacts MS–4a and closing contacts MS–4b upon passage of the original, closed contacts R–4a, R–1m, MS–5 and R–1j connect the power supply to relay R–4 for holding relay in its energized condition. Assuming that the operator has now made all the copies of the original martix 8 that is desired, toggle switch 165 is moved into its "release" position connecting the power supply to impeller motor control relay R–2. Relay R–2 is energized closing contacts R–2a and R–2b for connecting the power supply to impeller and timer motors 43, 157 respectively. Timer motor 157 drives cam shaft 158 and cam C–2 closes contacts C–2a completing another circuit to timer motor 157 so that it will continue to operate after toggle switch 165 returns to its normal position. Moving toggle switch 165 into its "release" position further energizes brake and deflector control relay R–6 closing normally open contacts R–6a for connecting the power supply through closed contacts R–4b to brake and deflector solenoids 134, 152 respectively for energizing same. Operation of brake solenoid 134 withdraws brake shoe 138 from anvil 123 releasing the new matrix which is deflected by deflector arms 145 for transporting the matrix into processing tray 2. A capacitor 169 is connected in parallel with relay R–6 to form a delay circuit for delaying the opening of contacts R–6a after toggle switch 165 returns to its normal position by discharging through relay R–6 and continuing to keep it energized to assure energization of deflector solenoid 152 for a sufficient time to enable the deflector arm 145 to deflect the new matrix downwardly into the nip between impeller and pressure rollers 36, 44 respectively. As soon as the trailing end of the new matrix releases actuating element 154 of microswitch MS–5, it returns to its normal position opening contacts MS–5a and closing contacts MS–5b. The timer motor 157 continues to drive the cams and when peripheral projection 166 of cam C–3 closes contacts C–3a energizing solenoid 167 for actuating a buzzer, the operator knows that the matrix has been developed for a sufficient period of time. Timer motor 157 continues to operate until cam follower 159 drops into a recess in cam C–1 opening contacts C–1a and disconnecting the power supply thereto.

The invention has been described in detail with particular reference to a preferred embodiment thereof, but it will be understood that variations and modifications can be effected within the spirit and scope of the invention as described hereinabove and as defined in the appended claims.

We claim:

1. In a photographic document copying device of the type in which a sensitized photographic matrix and an original document which is to be copied are arranged in superposed relation, exposed, and the exposed matrix developed and pressed into intimate face to face contact with an image receiving sheet which is separable from the matrix, the combination comprising: a receiving station for an original; exposing means; a matrix developing station; means for advancing a sensitized photographic matrix and an original arranged in superposed relation through said exposing means for exposing said matrix; means movable between a first position for directing said original to said receiving station, and a second position for directing said matrix to said developing station; and means for separating said original and matrix after said exposure and sequentially transporting the original and matrix to said directing means.

2. The invention according to claim 1 wherein said separatnig means comprises an anvil and a brake for releasably holding said matrix against said anvil while said original is engaged and transported alone by said transporting means, and for subsequently releasing said matrix for movement by said transporting means.

3. The invention according to claim 2 wherein said matrix has a tab portion extending past one edge of the original, and said brake is adapted to engage said tab of said matrix.

4. The invention according to claim 3 wherein said brake comprises a friction element movable into and out of engagement with said anvil.

5. The invention according to claim 4 wherein said friction element is biased by a spring into engagement with said anvil, and a solenoid is connected to said friction element and is adapted when energized to withdraw said friction element from said anvil.

6. The invention according to claim 1 wherein said transporting means comprises a movable conveyor element, and said separating means comprises a brake for temporarily holding said matrix while said original is engaged and transported alone by said conveyor element, and for subsequently releasing said matrix for movement by said conveyor element.

7. In a photographic document copying device of the type in which a sensitized photographic matrix and an original document which is to be copied are arranged in superposed relation with a tab of the matrix extending past one edge of the original, exposed, and the exposed matrix developed and pressed into intimate face to face contact with an image-receiving sheet which is separable from the matrix, the combination comprising: exposing means; a loading station at which a sensitized photographic matrix and an original are adapted to be arranged in superposed relation; means including a first switch actuable by said matrix and original as it is fed along said loading station toward said exposing means for advancing said matrix and original through said exposing means; a matrix developing station; means for introducing a matrix to said developing station; means movable between a normal first position for directing said original to said loading station, and a second position for directing said matrix to said introducing means; means for separating said original and matrix after said exposure and sequentially transporting the original and matrix to said directing means, said separating means including an anvil and a brake movable between a normal operative position in engagement with said anvil; a second switch in circuit with said separating means and interposed between said advancing means and said transporting means and actuable by the leading end of said original and matrix after exposure for moving said brake to said inoperative position to permit passage of said matrix and original between said brake and anvil, and further actuable by the trailing end of said matrix for moving said brake to said operative position for engaging and releasably holding said tab of said matrix against said anvil; means including a third switch actuable by said original as it is directed to said loading station for operating said brake for movement to its inoperative position releasing said matrix, and further operating and directing means for movement to its second position; means for feeding one end of an image-receiving sheet into superposed relation with the tab end of the developed matrix so that they can be mutually withdrawn from the device; and means for pressing said developed matrix into intimate face to face contact with said image-receiving sheet as they are withdrawn from the device for transferring an image from said matrix to said sheet upon separation of the two.

8. The invention according to claim 7 wherein said advancing means comprises a cylinder, an endless belt having a portion thereof wrapped around the periphery of said cylinder, and drive means for driving said belt.

9. The invention according to claim 8 wherein said transporting means comprises a plurality of spaced apart continuous conveyor belts driven by said drive means.

10. The invention according to claim 7 wherein said introducing means comprises a drive motor, a roller driven by said drive motor, and pressure roller bearing against said driven roller, said leading end of said matrix being directed into the nip formed by said pressure and driven rollers.

11. The invention according to claim 10 wherein said brake comprises a friction element biased by a spring into engagement with said anvil, and a solenoid is connected to said friction element and is adapted when energized to withdraw said friction element from said anvil, and said directing means comprises a plurality of axially spaced arms mounted on a rotatable shaft and extending into the space between said conveyor belts, a spring for urging said shaft and arms into said normal first position, and a solenoid connected to said shaft and adapted when energized to urge said shaft and arms into said second position.

12. The invention according to claim 11 wherein said means including a third switch comprises a drive motor actuable by said third switch, a pair of cams driven by said drive motor, and a pair of microswitches actuable by said cams for energizing said solenoid operated friction element for releasing said matrix, and said solenoid operated directing means for moving said arms into said second position.

13. The invention according to claim 7 wherein said device has an image-receiving sheet holder movable between operative and inoperative positions; a feed roller responsive to the position of said sheet holder and movable to an engaged position wherein said feed roller is in engagement with the image-receiving sheets in said holder for feeding same when said holder is in its operative position, and movable to a disengaged position wherein said feed roller is out of engagement therewith when said holder is in its inoperative position.

References Cited in the file of this patent

UNITED STATES PATENTS

| | | |
|---|---|---|
| 1,481,349 | Chisholm | Jan. 22, 1924 |
| 2,692,540 | Bing | Oct. 26, 1954 |
| 2,804,304 | Taini | Aug. 27, 1957 |